Aug. 24, 1965  B. R. SHELAR  3,202,871
SOLID STATE PROPORTIONAL POWER MODULATOR
Filed July 22, 1960  2 Sheets-Sheet 1

INVENTOR.
Balakrishna R. Shelar
BY
Frost & Vandenburgh
Attys.

INVENTORS
ROBERT O. RAGAN
MILES A. SNYDER
BY Robert M. Dunning
ATTORNEY

United States Patent Office 3,202,871
Patented Aug. 24, 1965

3,202,871
SOLID STATE PROPORTIONAL POWER
MODULATOR
Balakrishna R. Shelar, Oak Park, Ill.
(2906 Birch St., Franklin Park, Ill.)
Filed July 22, 1960, Ser. No. 44,615
16 Claims. (Cl. 315—158)

The present invention relates to an apparatus for controlling current flow.

The commonly used devices for controlling current flow are generally in the nature of a resistance-type apparatus in which a portion of the current is dissipated in the form of heat. In contradistinction, the present invention uses more or less of the alternating current cycle to obtain a greater or smaller current flow through the load, i.e., the device to be operated by the alternating current. Since current supplied to the load is proportional to the control current, the systems disclosed herein operate on phase modulation principles and, moreover, since such control is effected through the use of solid state components, the systems may be suitably denominated as solid state proportional power modulators.

The present invention is applicable to innumerable different types of alternating current loads. For example, it might be used to control the illumination provided by a light source. In such an application, the current flow to the light source can be controlled by a photoelectric cell with sufficient current being supplied to the lights so that the total illumination from all sources in the lighted area always is constant. For example, in a shop window, or in a manufacturing plant, the photoelectric cell would be placed to measure the illumination from both natural light and artificial light at all times. As the amount of artificial light increased or decreased, a corresponding reduction or increase of the light furnished by the artificial lights would be made.

Another noteworthy application would be in controlling the current flow in an electric resistance welding apparatus. The present invention would be used to control the current supply to the welding transformer and to maintain that current at a constant, predetermined amount. Thus, as the length of the arc was varied by the welder, a corresponding variation in welding current would not occur.

One of the principal features of my invention is that effective current control is maintained over the entire predetermined range of operation of the system, i.e., control is maintained from the full rated load voltage to zero load voltage, substantially as a linear function of the control current. In prior art devices, this was not possible because of the substantial change in slope of the curve formed by plotting the load voltage against the control current.

Other features of my invention include: embodiments of my invention may be constructed within a very small cubic space and with very little weight as compared to prior art current control devices of a corresponding capacity; embodiments may be constructed utilizing only solid-state parts and, thus, substantially more rugged and shock-resistant than devices which utilize vacuum tubes; the current-flow to the load may be controlled as a function of one or a plurality of variables, and an accurate and reliable automatic current overload control may be incorporated with only little addition to the basic structure.

Although useful for other applications, the present invention is especially suitable for controlling an apparatus utilizing devices such as silicon-controlled rectifiers. Silicon-controlled rectifiers are well known in the art and are described in the book Controlled Rectifier Manual, General Electric Company (1960). These devices are characterized by the ability to commence conduction at a forward voltage value determined by the current flow to the gate electrode. Once the gate electrode current reaches the conduction-initiating value for any forward voltage of the silicon-controlled rectifier, the gate loses control and current flow continues until the forward voltage drops to a very much lower value which, for example, may take place when the applied alternating current voltage wave reverses.

Where herein I refer to "phase shifting means" I intend to refer to means for producing firing pulses for application to a silicon rectifier which are variable in position on the time (phase) axis of the voltage applied to a rectifier in order to initiate conduction of the rectifier for a desired period of time (phase) whereby the output of the rectifier is made a function of the variable pulse with respect to time.

Effective control action with silicon-controlled rectifiers requires that the phase position of the triggering gate current pulse be adjustable between a position of maximum delay wherein the silicon-controlled rectifier average current value is very low and a position of maximum advance wherein the average current value is maximum and as nearly as possible equal to the average current value of the full half wave during which conduction can take place. Such control action further demands that the "transfer characteristic" of the control circuitry, i.e., the change in average current through the rectifier for a predetermined change in control current, be as uniform as possible over the control range. Nearly flat points, where little or no control takes place, represent points of low or even zero amplification in the control circuit and give rise to loss of control.

In one particularly desirable and efficient manner of obtaining current pulses for the control of silicon-controlled rectifiers or other devices, the pulses are developed through the application of the alternating current wave, or the portion thereof preceding the pulse, to a saturable reactor. The reactor has an initial high inductance that prevents current build-up until saturation is reached, at which time the current flow rapidly increases in value, thus providing a sharply increasing current wave-front. This current wave-front is further increased in slope by a parallel resistance-capacitor circuit in series with the reactor, which acts to increase the slope of the wave-front, i.e., sharpen the pulse that serves to trigger the silicon-controlled rectifier and thereby initiate conduction therethrough.

In a circuit of the above type, the timing of the current pulse can be varied by varying the value of the bias applied to the control winding. As current flow in this winding, e.g., the winding 16 is increased in the direction to produce flux opposing the magnetomotive force of current build-up in the gate-energizing winding, e.g., winding 13 or 14 the current value in the gate-energizing winding (or gate winding) required for magnetic saturation increases. Conversely, the gate winding current for saturation can be decreased by applying a positive bias or control magnetomotive force through the control winding. Since the pulses in the gate winding are developed through the application of the sine wave of power supply voltage, the effect of current flow in the control winding is to advance or retard the instant at which magnetic saturation occurs in the reactor, and hence the instant when the current pulse is applied to the gate and cathode of the silicon-controlled rectifier. Control of the average current flow through the silicon-controlled rectifier is thereby obtained through control of the bias current applied to the control winding.

Control of the above type is, however, subject to a problem of loss of control in the low control current region. For example, the voltage across the load may be reduced essentially to zero at one control current value and, at half of that value, the output voltage may be more than 90% of the maximum voltage. The minimum slope of the control curve may then be less than one-thirtieth of the maximum slope. The lower half of the control current is then substantially ineffective for control purposes.

In accordance with the present invention, this problem is minimized and essentially the full range of the control current is made effective for control purposes. This is accomplished through the use of a tertiary or modifying winding on the saturable reactor. This winding is closed through a relatively low external resistance. It has been found that with appropriate tertiary winding values the effect of control winding current on the voltage of a load fed by a silicon-controlled rectifier can be linearized and therefore made more effective for control purposes.

The following description of specific embodiments of my invention is for the purpose of complying with 35 U.S.C 112 and should not be construed as imposing unnecessary limitations upon the appended claims inasmuch as modifications and variations thereof will be apparent to those skilled in the art from the subsequent description. For example, in the illustrated and described embodiments, the apparatus is for full wave operation. To those skilled in the art, it will be readily apparent how portions thereof are utilized for half wave operation in accordance with the foregoing description of the invention. Further objects and advantages will be apparent from the following description taken in conjunction with the drawings, in which:

FIGURE 3 is a graph showing the effect of the control current on the load voltage for an embodiment such as that illustrated in FIGURE 1; and FIGURE 4 is a schematic illustration of an embodiment used to control the current flow in a welding transformer.

Figures 1, 2:
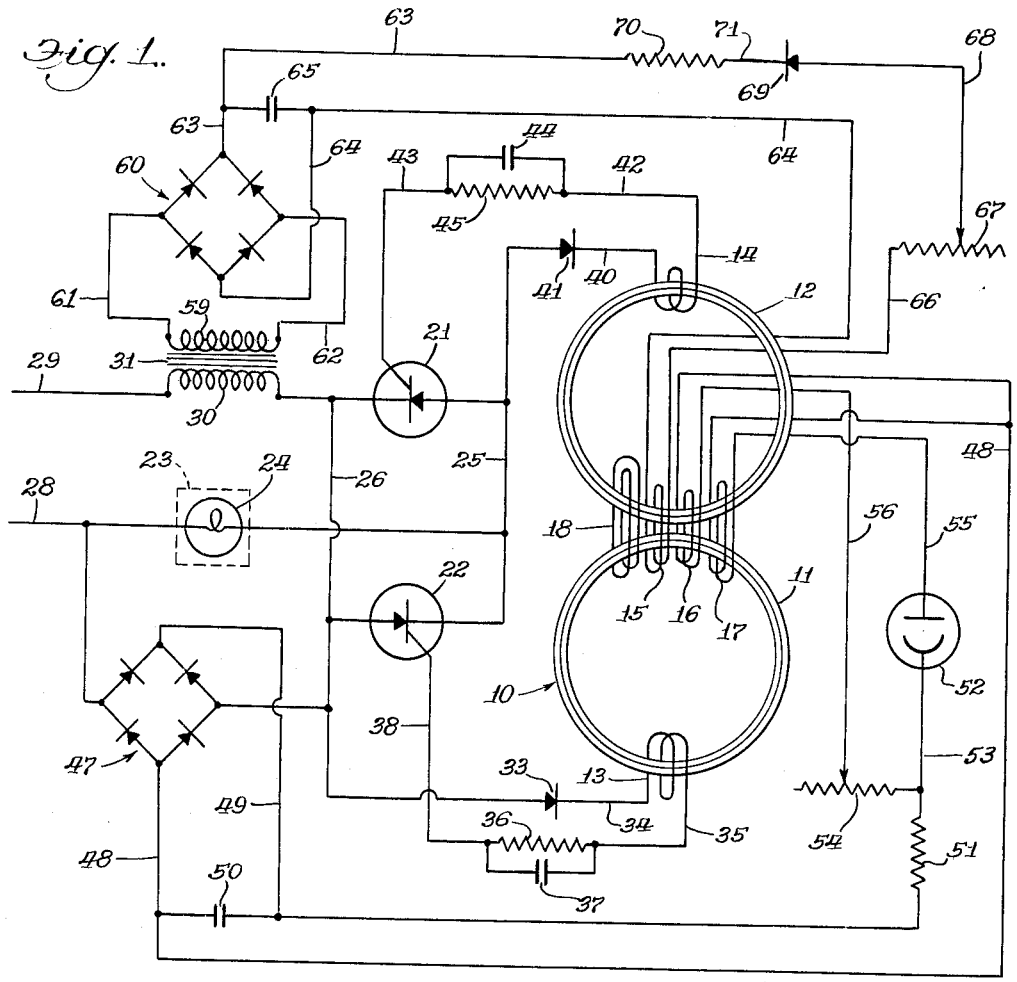
FIGURE 1 is a schematic illustration of an embodiment used as a light control.
FIGURE 2 is a sectional perspective view of the reactor utilized in the embodiment of FIGURE 1.
Figure 5:
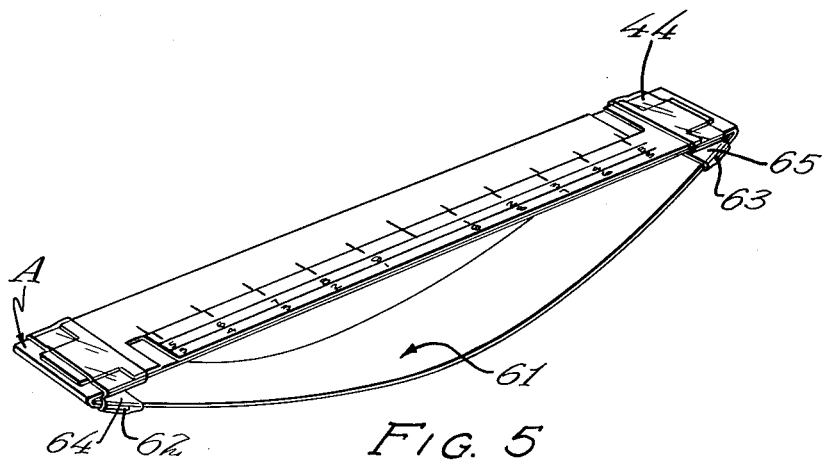
Figure 6:
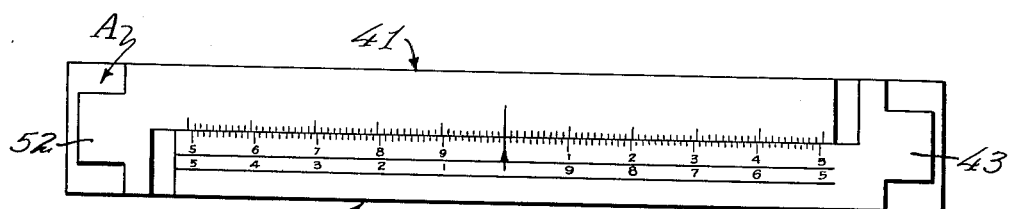
Figure 7:
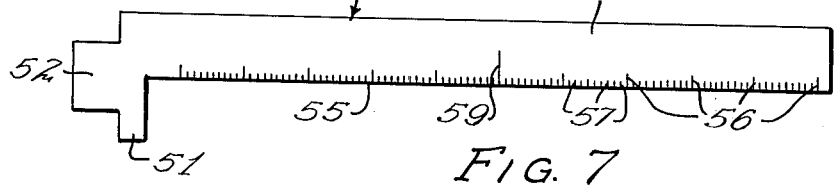
Figure 8:
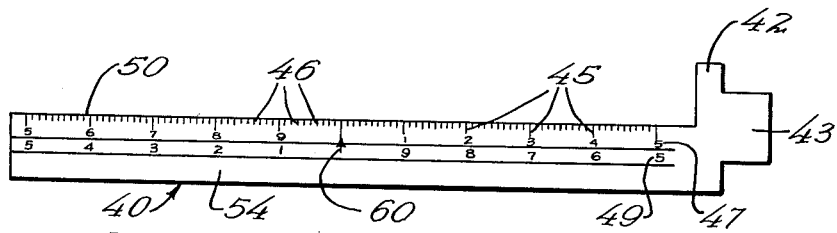

FIGURES 1 and 2 illustrate a saturable core reactor generally 10 having a pair of cores 11 and 12. As illustrative of the size of such a reactor, in one embodiment of a light control handling 15 to 20 watts approximately the cores 11 and 12 have an inner diameter of 1 inch and an outer diameter of 1½ inches. The thickness of the core is ⅜ inch. On core 11 is a gate winding 13. A corresponding gate winding 14 is received on core 12. In the specific embodiment mentioned, gate windings 13 and 14 each consist of 5,000 turns of No. 36 wire.

A plurality of control windings 15, 16 and 17 link the two cores 11 and 12. Similarly, the modifying winding 18 previously referred to which, in the example, is a closed winding, links the two cores 11 and 12. In the aforementioned specific embodiment, windings 15–18 each consist of 200 turns of No. 31 wire. It will be appreciated by those skilled in the art that the embodiment illustrated in FIGURE 1 is a full wave embodiment. For half wave operation, one of the cores, e.g., 11, and its gate winding, e.g., 13, are eliminated and the rectifier circuit correspondingly modified.

A pair of silicon-controlled rectifiers 21 and 22 are used to govern the flow of current through a load 23. In the example, rectifiers 21 and 22 are General Electric Company Type C35B. In the disclosed embodiment, load 23 comprises one or more electric lights 24. A wire 25 connects the anode of rectifier 21 with the cathode of rectifier 22. A wire 26 connects the cathode of rectifier 21 with the anode of rectifier 22. Thus, it will be seen that the two silicon-controlled rectifiers 21 and 22 are connected in what may be termed an inverse, parallel arrangement.

Wire 25 also connects to one side of the light 24. The other side of light 24 is connected to a wire 28, which along with wire 29 leads to a suitable source of 115 volt alternating current (not shown). Wire 29 connects to one side of the primary winding 30 of an overload current transformer 31. The other side of the primary winding 30 is connected to wire 26.

Gate winding 13 is connected between the gate and the anode of rectifier 22 to provide the triggering pulses to initiate conduction of the rectifier. To this end, wire 26 connects to the anode of a diode 33. The cathode of diode 33 is connected to one side of gate winding 13 by a wire 34. The other side of gate winding 13 is connected by a wire 35 to a resistor 36 and a capacitor 37 in parallel with each other. A wire 38 connects the resistor and capacitor with the gate of rectifier 22.

The connection of gate winding 14 to rectifier 21 corresponds to that just described with respect to rectifier 22. A wire 40 and wire 25 connect diode 41 to gate winding 14 and the anode of rectifier 21, respectively. A wire 42 and a wire 43 connect the parallel capacitor 44 and resistor 45 to gate winding 14 and the gate of rectifier 21, respectively.

In the specific embodiment mentioned, diodes 33 and 41 have a rating of 75 milliamperes of current and 200 volts peak voltage. Resistors 36 and 45 are each 2,000 ohms and capacitors 37 and 44 are 0.45 microfarad.

Wires 28 and 26 are connected to the input of a full wave rectifier assembly generally 47 with wires 48 and 49 being connected to the rectified output thereof. A filter capacitor 50 is connected across wires 48 and 49. Wire 48 connects to one side of each of control windings 16 and 17. Wire 49 connects to a voltage-dropping resistor 51 to protect a photo-conductive cell 52, e.g. a cadmium sulfide cell, placed in the area in which the illumination is to be controlled. One side of cell 52 is connected by a wire 53 to resistor 51 and to a potentiometer 54. The other side of cell 52 is connected by a wire 55 to the other terminal of control winding 17. A wire 56 connects potentiometer 54 to the other terminal of control winding 16. It will be apparent that other control devices may be substituted to control loads of other types.

The ratings of the rectifiers that make up the full wave rectifier assembly 47 may correspond to those of rectifiers 33 and 41. Filter capacitor 50 is 10 microfarads. Dropping resistor 51 and potentiometer 54 are each 10,000 ohms.

The secondary winding 59 of current transformer 31 is connected to the input of a full wave rectifier assembly generally 60 by wires 61 and 62. Wires 63 and 64 are connected to the rectifier output of the full wave rectifier assembly 60. A capacitor 65 is connected between wires 63 and 64 both as a filter and to integrate the load current flowing through the primary 30. Wire 64 leads to one side of control winding 15. The other side of the control winding is connected by a wire 66 to potentiometer 67. A wire 68 connects potentiometer 67 with the anode of a Zener diode 69. A resistor 70 is connected between the cathode of diode 69 and wire 63 by a wire 71 to protect the Zener diode against excessive voltage. In the present case, the Zener diode is used in a current feed-back arrangement thereby yielding several hundred times higher gain. The feed-back loop includes the winding 59, rectifier 60, resistor 70, Zener diode 69, potentiometer 67, winding 15 and the leads interconnecting the same.

Potentiometer 67 is 10,000 ohms while resistor 70 is 27 ohms. Capacitor 65 is 10 microfarads. A Zener diode is characterized in that the current increases very rapidly with a small increase in voltage.

The windings of the reactor 10 are all wound in the same direction. The ends of the coils represented by wire 40, wire 34, wire 48 and wire 64 are the "start." The ends of the coils represented by wire 42, wire 35, wire 55, wire 56 and wire 66 are the "finish."

The operation of the apparatus illustrated in FIGURE 1 will be understood by those skilled in the art from the preceding description of my invention. The photoconductive cell 52 varies in resistance depending upon the light intensity falling on the cell. With a decrease in light intensity, the resistance of the cell will increase and the current to control winding 17 decreases. This increases the firing angle of the gate pulses, the output voltage increases and the lamps receive more current. Potentiometer 54 and control winding 16, in parallel with cell 52, serve as a manual control over the action of cell 52 and control winding 17. Control over the operation of the photocell also may be effected by varying the resistance of resistor 51.

A pulse produced in gate winding 13, by the change in the flux produced by a current change in control winding 16, is peaked by the parallel resistance 36 and capacitor 37. The pulse then triggers the silicon-controlled rectifier 22. Similarly, pulses from gate winding 14 will trigger silicon-controlled rectifier 21. Rectifiers 21 and 22, of course, are triggered alternately during the opposite halves of the alternating current sine wave at 28 and 29. When either of the silicon-controlled rectifiers is triggered, before or after the positive peak of the sine wave, that rectifier commences conducting and continues conducting until the next zero point in the wave. However, if the rectifier is triggered immediately prior to that next zero point, it will conduct for only an extremely short time, and very little current will flow. Thus, the current flow through the load 23 will be extremely small. As the phase of the triggering impulse is moved back, i.e., a greater distance in time ahead of the next zero point, the greater will be the current flow during the time that the triggered rectifier is conducting viz. the greater will be the angle of conduction of the rectifier. Conversely the angle in electrical degrees before the rectifier becomes conductive is known as the "angle of ignition" and, thus, the greater will be the current flow through the load 23.

Control winding 15, energized from overload transformer 31, acts as a protective overload control for the described apparatus. If the current flow through load 23 should exceed a pre-set level the controlled rectifiers 21 and 22 are endangered or short-circuited. That same current flow through the primary 30 of transformer 31 produces a large D.C. current through control winding 15. In such a case, control winding 15 serves to shift the phase of the pulses in the gate windings 13 and 14 so that the phase of the pulses to the gates of the silicon-controlled rectifiers 21 and 22 is shifted in the direction of the zero points at which the rectifiers would discontinue conducting, and, thus, acts to decrease the current flow through the load and the transformer 31.

The effect of the modifying winding 18 is illustrated in FIGURE 3. In this figure, the effect of varying the control current through one control winding is plotted against the resulting voltage across the load 23. The full line curve 73 illustrates the corresponding relationship when the modifying winding 18 is employed. The dotted line portion 74 illustrates the change in the upper portion of the curve when the modifying winding 18 is not employed. Without the modifying winding, it will be noted from the curve 74 that there is a very substantial change in slope of the curve between the extremely low and the extremely high control current areas. However, when the modifying winding 18 is employed, the slope of the curve in the low control current region is rendered much more nearly linear as compared to the slope of the curve in the high control current region. This is illustrated by the solid line curve 73. Through the use of my invention, it is easily possible to maintain a linear relation between input and output for the full 180° of the half-cycle of the alternating current.

In practice, I have found that, in order that devices embodying the principles of the invention shall function usefully, the number of turns required for the tertiary winding must be established somewhat empirically. The technique of winding the teritary winding and control windings will be such as to reduce the voltages induced in these windings to almost zero. However, a finite voltage is induced in all of these coils, i.e., the teritary and control windings. This voltage is a function of the number of turns of the windings, the core material and its history, the excitation voltage and current, the internal resistance of the windings, the coupling of the windings, the mode of operation of the magnetic amplifier and other related factors. The foregoing finite induced voltage (often objectionable) is employed here to serve as a feed-back to further desaturate the then-unsaturated core by virtue of the flow of the finite, but sufficient current, as determined by the resistance of the teritary winding, both internal and external. This maximum desaturation of the core extends the linear control range of operation with a substantially improved gain (FIG. 3).

The wiring diagram in FIGURE 4 illustrates the use of my invention for current control in an arc welding apparatus. In this case, the load 23 is an arc welding transformer having its primary winding 76 connected between wires 25 and 28. The secondary winding 77 feeds the arc welding apparatus (not shown) of a conventional type. Control windings 16 and 17 of FIGURE 1 are not used in the apparatus of FIGURE 4. They may be either left unconnected on the reactor 10 or they may be dispensed with when the reactor 10 is wound.

In the operation of the apparatus of FIGURE 4, a change in length of the arc will act to change the current flow through the secondary 77 of the arc welding transformer. This, in turn, will change the current flow through the primary 76 of the transformer and through the primary 30 of the control transformer 31 since these latter two windings are in series. The change in current flow in the primary of transformer 31 is reflected in the secondary and will be also reflected in the current flow through the control winding 15. As was the case with respect to FIGURE 1, a change in the current flow through winding 15 will vary the phase of the pulses produced in the gate windings 13 and 14. The phase of the pulses will be advanced or retarded, depending upon whether there is an increase or a decrease in the current flow through windings 76 and 30. Thus, the arc current is self-regulating for any given setting of the manual control on potentiometer 67. Potentiometer 67, of course, is set at the beginning of the welding operation to produce any desired arc current within the ratings of a specific embodiment.

A welding control apparatus such as that illustrated in FIGURE 4 will weigh only a small fraction of the weight of a conventional apparatus of similar rating and capabilities. At the same time, the new device is much smaller in cubic size than is the conventional device. While the embodiment illustrated is for single-phase operation, it will be apparent to those skilled in the art that the invention is applicable to three-phase circuits merely by utilizing three units, one in each phase.

I claim:

1. Means for controlling the current flow from a source of alternating current through a load, said means comprising: a first controlled rectifier having an anode, a cathode and a gate electrode, said cathode being connected with one side of said source and said anode being connected to said load; a magnetic amplifier including a saturable magnetic core, a gate winding on said core connected between said gate electrode and anode, a control winding on said core, and a tertiary winding on said core having a closed, relatively low resistance path to provide linear relation between control current and load voltage; a second gate winding on said core; a second controlled rectifier having an anode, cathode and a gate electrode; means connecting the second gate winding between the anode and gate electrode of said second rectifier; the cathode of the first rectifier being connected to the anode of the second rectifier and vice versa; and means to apply direct current to one of said control windings.

2. A system for controlling the current flow from a source of alternating current through a load, said system comprising: a pair of silicon-controlled rectifiers each having an anode, a cathode and a gate electrode; a wire connecting the anode of one rectifier with the cathode of the other rectifier and a wire connecting the cathode of said one rectifier with the anode of said other rectifier, whereby said rectifiers are in back-to-back arrangement; conductor means forming a series circuit through said pair of rectifiers, said load and said source; phase-shifting means including first and second saturable magnetic cores, a gate winding individual to each core, a control winding linking said cores, and another winding linking said cores, sad other winding having a closed, relatively low resistance current path to provide linear relation between the control curent and load voltage; means forming a series circuit between the gate electrode and the anode of one rectifier and one gate winding; means forming a series circuit between the gate electrode and the anode of the other rectifier and the other gate winding; said gate windings providing pulses to fire said rectifiers alternately.

3. A system for controlling the flow of alternating current through a load comprising: a current transformer having primary and secondary windings; a pair of silicon-controlled rectifiers each having an anode, a cathode and a gate electrode; a wire connecting the anode of one rectifier with the cathode of the other rectifier and a wire connecting the cathode of said one rectifier with the anode of said other rectifier, whereby said rectifiers are in back-to-back arrangement; conductor means forming a series circuit through said paired rectifiers, said primary winding, said load and said source; phase shifting means including a first core, a first gate winding on said core, a second core, a second gate winding on said second core, a control winding linking said two cores, and another winding linking said cores, said other winding having a closed, relatively low resistance current path to provide linear relation between control current and load voltage; means forming a series circuit between the gate electrode and the anode of one rectifier and one gate winding; means forming a series circuit between the gate electrode and the anode of the other rectifier and the other gate winding; and means to apply a direct current to said control winding, including a full wave rectifier having an input connected to said secondary winding and its rectified output in series with said control winding whereby variation of load current through said primary winding and controlled rectifiers will induce current flow in said secondary winding to vary the effect of the control winding in shifting the phase determined by the phase shifting means in inverse proportion.

4. In a device for controlling the illumination of light means supplied by an alternating current source, a control circuit comprising: a pair of silicon-controlled rectifiers each having an anode, a cathode and a gate electrode; a wire connecting the anode of one rectifier with the cathode of the other rectifier and a wire connecting the cathode of said one rectifier with the anode of said other rectifier, whereby said rectifiers are in back-to-back arrangement; conductor means forming a series circuit through said rectifiers, said light means and said source; a magnetic amplifier including a first core, a first gate winding on said core, a second core, a second gate winding on said second core, a pair of control windings linking said two cores, means forming a series circuit between the gate electrode and the anode of each rectifier and respective ones of said gate windings; a photoelectric cell positioned to be activated by said illumination; means to supply direct current; means connecting said cell, one of said control windings and said direct current supply in series to control the light means in response to varying illumination on said cell.

5. A system for controlling the flow of alternating current through a load comprising: a current transformer having primary and secondary windings; a pair of silicon-controlled rectifiers each having an anode, a cathode and a gate electrode; a wire connecting the anode of one rectifier with the cathode of the other rectifier and a wire connecting the cathode of said one rectifier with the anode of said other rectifier, whereby said rectifiers are in back-to-back arrangement; conductor means forming a series circuit through said paired rectifiers, said primary winding, said load and said source; phase-shifting means including a first core, a first gate winding on said core, a second core, a second gate winding on said second core, a control winding linking said two cores, means forming a series circuit between the gate electrode and the anode of one rectifier and one gate winding; means forming a series circuit between the gate and the anode of the other rectifier and the other gate winding; and means to apply a direct current to said control winding including a full wave rectifier having an input connected to said secondary winding and its rectified output in series with said control winding whereby variation of load current through said primary winding and controlled rectifiers will induce current flow in said secondary winding to vary the effect of the control winding in shifting the phase determined by the phase shifting means in inverse proportion.

6. The combination in accordance with claim 3 further characterized by a voltage regulating device operating to provide a current feedback in series with the control winding.

7. A device for controlling the instantaneous condition of a controlled device supplied by alternating current comprising: a pair of silicon-controlled rectifiers each having an anode, a cathode and a gate electrode; a wire connecting the anode of one rectifier with the cathode of the other rectifier and a wire connecting the cathode of said one rectifier with the anode of said other rectifier, whereby said rectifiers are in back-to-back arrangement; conductor means forming a series circuit through said rectifiers, said controlled device and said source; a magnetic amplifier including a first core, a first gate winding on said core, a second core, a second gate winding on said second core, a pair of control windings linking said two cores; means forming a series circuit between the gate electrode and the anode of each rectifier and respective ones of said windings; a controlling device arranged in feed-back relation with said controlled device; means to supply direct current; means connecting said controlling device, one of said control windings and said direct current supply in series to control the controlled device in response to varying conditions of said controlling device.

8. A system for controlling the flow of alternating current through a load comprising; a current transformer having a primary winding and secondary windings; a pair of silicon-controlled rectifiers each having an anode, a cathode and a gate electrode; a wire connecting the anode of one rectifier with the cathode of the other rectifier and a wire connecting the cathode of said one rectifier with the anode of said other rectifier, whereby said rectifiers are in back-to-back arrangement; conductor means forming a series circuit through said paired rectifiers, said primary winding, said load and said source; phase-shifting means including a first core, a first gate winding on said core, a second core, a second gate winding on said second core, a control winding linking said two cores, and another winding linking said cores, said other winding having a closed, relatively low resistance current path to provide linear relation between control current; means forming a series circuit between the gate electrode and the anode of one rectifier and one gate winding; means forming a series circuit between the gate and the anode of the other rectifier and the other gate winding; and means to apply a direct current to said control winding, including a full wave rectifier having an input connected to said secondary winding and its rectified output in series with said control winding, whereby current flow in said primary winding in excess of a predetermined value increases current in said control winding to retard the angle of conduction substantially to zero degrees and therefore reduce current flow through the controlled rectifiers to a predetermined safe level.

9. In a device for controlling the power to a varying load supplied by an alternating current source, a control circuit comprising: a pair of silicon-controlled rectifiers each having an anode, a cathode and a gate electrode; a wire connecting the anode of one rectifier with the cathode of the other rectifier and a wire connecting the cathode of said one rectifier with the anode of said other rectifier, whereby said rectifiers are in back-to-back arrangement; conductor means forming a series circuit through said rectifiers, said load and said source; a magnetic amplifier including a first core, a first gate winding on said core, a second core, a second gate winding on said second core, a pair of resistor and capacitor pulse shaping networks, a pair of unidirectional current conducting devices, and a pair of control windings linking said two cores; means including said gate windings, said unidirectional current conducting devices and said pulse shaping networks effective to develop a current firing pulse to the gate electrodes of each rectifier from respective ones of said gate windings; a sensing means responsive to variations in said load; means to supply direct current; means connecting said sensing means, one of said control windings and said direct current supply in series to control the load means in response to said sensing means.

10. In a device for controlling the power to a varying load supplied by an alternating current source, a control circuit comprising: a pair of silicon-controlled rectifiers each having an anode, a cathode and a gate electrode; a wire connecting the anode of one rectifier with the cathode of the other rectifier and a wire connecting the cathode of said one rectifier with the anode of said other rectifier, whereby said rectifiers are in back-to-back arrangement; conductor means forming a series circuit through said rectifiers, said load and said source; a magnetic amplifier including a first core, a first gate winding on said core, a second core, a second gate winding on said core, and a plurality of control windings linking said two cores; means including said gate windings effective to develop a current firing pulse to the gate electrodes of each rectifier from respective ones of said gate windings; a sensing means responsive to variations in said load; means to supply a control current; means connecting said sensing means, one of said control windings and said control current supply in series to control the load means in response to said sensing means.

11. Means for controlling the current flow from a source of alternating current through a load, said means comprising: a first controlled rectifier having an anode, a cathode and a gate electrode, said cathode being connected with one side of said source and said anode being connected to said load; a magnetic amplifier including a saturable magnetic core structure, a gate winding on said core structure connected to said gate electrode, a control winding on said core structure, and a tertiary winding on said core structure having a closed, relatively low resistance path to provide a linear relation between control current and load voltage; a second gate winding on said core structure; a second controlled rectifier having an anode, a cathode and a gate electrode; means connecting the second gate winding to the gate electrode of said second rectifier; the cathode of the first rectifier being connected to the anode of the second rectifier and vice versa; and means to apply current to said control winding.

12. Means for controlling the current flow from a source of alternating current through a load, said means comprising: a first controlled rectifier having an anode, a cathode and a gate electrode, said cathode being connected with one side of said anode being connected to said source and said load; a magnetic amplifier including a saturable magnetic core, a gate winding on said core, means including said gate winding effective to develop a current firing pulse to the gate electrode of said first controlled rectifier, a plurality of control windings on said core, and a tertiary winding on said core having a closed, relatively low resistance path to provide a linear relation between control current and load voltage, a second gate winding on said core; a second controlled rectifier having an anode, a cathode and a gate electrode; means including the second gate winding effective to develop a current firing pulse to the gate electrode of said second controlled rectifier; the cathode of the first rectifier being connected to the anode of the second rectifier and vice versa; and means to apply a control current to one of said control windings.

13. A fuseless output system for controlling the flow of alternating current through a load comprising: a current transformer having primary and secondary windings; a pair of silicon-controlled rectifiers each having an anode, a cathode and a gate electrode, conductor means connecting the anode of one rectifier with the cathode of the other rectifier and another conductor means connecting the cathode of said one rectifier with the anode of said other rectifier, whereby said rectifiers are in back-to-back arrangement; conductor means forming a series circuit through said paired rectifiers, said primary winding, said load and said source; phase-shifting means including a first core, a first gate winding on said core, a second core, a second gate winding on said second core, a control winding linking said two cores, and another winding linking said cores, said other winding having a closed, relatively low resistance current path to provide a linear relation between control current and load voltage; first firing means including said one gate winding to develop a current firing pulse to the gate electrode of one rectifier; and second firing means including said second gate winding to develop a current firing pulse to the gate electrode of the other rectifier; and an output current limiting means operated to apply a direct current to said control windings, including a full wave rectifier having an input connected to said secondary winding with its rectified output in series with said control winding, whereby current flow in said primary in excess of a predetermined value increases current in said control winding to retard the angle of conduction substantially to zero degrees and said current flow through the controlled rectifiers to a predetermined safe level.

14. A system for controlling the flow of alternating current through a load comprising: a current transformer having primary and secondary windings; a pair of silicon-controlled rectifiers each having an anode, a cathode and a gate electrode, a wire connecting the anode of one rectifier with the cathode of the other rectifier and a wire connecting the cathode of said one rectifier with the anode of said other rectifier, whereby said rectifiers are in back-to-back arrangement; conductor means forming a series circuit through said paired rectifiers, said primary winding, said load and said source; phase-shifting means including a first core, a first gate winding on said core, a second core, a second gate winding on said second core, a control winding linking said two cores, and a means for suppressing the inrush currents to said load comprising another winding linking said cores, said other winding having a closed, relatively low resistance current path; means forming a series circuit between the gate electrode and the anode of one rectifier and one gate winding; means forming a series circuit between the gate and the anode of the other rectifier and the other gate winding; and means to apply a direct current to said control winding, including a full wave rectifier having an input connected to said secondary winding and its rectified output in series with said control winding, whereby current flow in said primary in excess of a predetermined value increases current in said control winding to retard the angle of conduction substantially to zero degrees and therefore reduce current flow through the controlled rectifiers to a predetermined safe level.

15. A fuseless output system for controlling the flow of alternating current through a load comprising: a current transformer having primary and secondary windings; a pair of silicon-controlled rectifiers each having an anode, a cathode and a gate electrode, a wire connecting the anode of one rectifier with the cathode of the other rectifier and a wire connecting the cathode of said one rectifier with the anode of said other rectifier, whereby said rectifiers are in back-to-back arrangement; conductor means forming a series circuit through said paired rectifiers, said primary winding, said load and said source; phase-shifting means including a first core, a first gate winding on said core, a second core, a second gate winding on said second core, a control winding linking said two cores, and including a means for providing for the suppression of inrush currents to said load comprising another winding linking said cores, said other winding having a closed, relatively low resistance current path; means forming a series circuit between the gate electrode and the anode of one rectifier and one gate winding; means forming a series circuit between the gate and the anode of the other rectifier and the other gate winding; and an output current limiting means operated to apply a direct current to said control winding, including a full wave rectifier having an input connected to said secondary winding with its rectified output in series with said control winding, whereby current flow in said primary in excess of a predetermined value increases current in said control winding to retard the angle of conduction substantially to zero degrees and said current flow through the controlled rectifiers is reduced to a predetermined safe level.

16. A fuseless output system for controlling the flow of alternating current through a load comprising: a current transformer having primary and secondary windings; a pair of silicon-controlled rectifiers each having an anode, a cathode and a gate electrode, a wire connecting the anode of one rectifier with the cathode of the other rectifier and a wire connecting the cathode of said one rectifier with the anode of said other rectifier, whereby said rectifiers are in back-to-back arrangement; conductor means forming a series circuit through said paired rectifiers, said primary winding, said load and said source; phase-shifting means including a first core, a first gate winding on said core, a second core, a second gate winding on said second core, a plurality of control windings linking said two cores, said plurality of control windings connected to operate in any one of various basic modes of operation, first circuit means connecting the gate electrode of one rectifier and one gate winding in series with said one anode; second circuit means connecting the gate electrode of the other rectifier and the other gate winding in series with said other anode; and an output current limiting means operated to apply a direct current to one of said control windings, including a full wave rectifier having an input connected to said secondary winding with its rectified output in series with said control winding, current flow in said primary in excess of a predetermined value increases current in said control winding to retard the angle of conduction substantially to zero degrees, said current flow through the controlled rectifiers is thereby reduced to a predetermined safe level.

References Cited by the Examiner

UNITED STATES PATENTS

| | | | |
|---|---|---|---|
| 2,151,753 | 3/39 | Etzrodt | 315—196 X |
| 2,552,203 | 5/51 | Morgan | 330—8 |
| 2,779,897 | 1/57 | Ellis | 315—158 X |
| 2,807,753 | 9/57 | Steinitz | 315—311 X |
| 2,880,374 | 3/59 | Mulder | 315—205 |
| 2,920,240 | 1/60 | Macklem | 315—201 |
| 2,966,614 | 12/60 | Favre | 315—205 X |
| 2,987,666 | 6/61 | Manteuffel | 315—205 X |
| 2,998,547 | 8/61 | Berman | 315—200 |
| 3,102,229 | 8/63 | Darling | 323—89 |
| 3,129,381 | 4/64 | Manteuffel | 323—89 |
| 3,137,823 | 6/64 | Cioccio et al. | 330—8 |

FOREIGN PATENTS 792,916   4/58  Great Britain.

OTHER REFERENCES

Article, "Magnetic Amplifiers Triggers Silicon Controlled Rectifiers" in "Electrical Design Ideas" by Robers Publishing Co., 85 W. Harrison St., Chicago 5, Ill., June 1959, pp. 20–21.

GEORGE N. WESTBY, *Primary Examiner.*

RALPH G. NILSON, BENNETT G. MILLER,
*Examiners.*

UNITED STATES PATENT OFFICE
CERTIFICATE OF CORRECTION

Patent No. 3,202,871 August 24, 1965

Balakrishna R. Shelar

It is hereby certified that error appears in the above numbered patent requiring correction and that the said Letters Patent should read as corrected below.

Column 8, line 64, after "current" insert -- and load voltage --.

Signed and sealed this 1st day of February 1966.

(SEAL)
Attest:

ERNEST W. SWIDER
Attesting Officer

EDWARD J. BRENNER
Commissioner of Patents